United States Patent
Park et al.

(10) Patent No.: US 8,085,131 B2
(45) Date of Patent: Dec. 27, 2011

(54) SYSTEM FOR TAG ESTIMATION AND ANTI-COLLISION AND METHOD THEREOF

(75) Inventors: Jongho Park, Daejeon (KR); Min-Yong Chung, Seoul (KR); Tae-Jin Lee, Gyeonggi-do (KR)

(73) Assignee: Sungkyunkwan University Foundation for Corporate Collaboration, Suwon, Gyeonggi-Do (KR)

( * ) Notice: Subject to any disclaimer, the term of this patent is extended or adjusted under 35 U.S.C. 154(b) by 1062 days.

(21) Appl. No.: 11/710,133

(22) Filed: Feb. 23, 2007

(65) Prior Publication Data

US 2008/0150674 A1 Jun. 26, 2008

(30) Foreign Application Priority Data

Dec. 21, 2006 (KR) .................. 10-2006-0132162

(51) Int. Cl.
*H04Q 3/00* (2006.01)

(52) U.S. Cl. .................. 340/10.2; 340/572.1; 340/10.1; 340/3.41

(58) Field of Classification Search .................. 340/10.2
See application file for complete search history.

(56) References Cited

U.S. PATENT DOCUMENTS

| | | | |
|---|---|---|---|
| 2001/0014090 A1* | 8/2001 | Wood, Jr. .................. | 370/348 |
| 2007/0096877 A1* | 5/2007 | Quan et al. .................. | 340/10.2 |
| 2007/0126555 A1* | 6/2007 | Bandy .................. | 340/10.2 |
| 2007/0139199 A1* | 6/2007 | Hanlon .................. | 340/572.1 |
| 2008/0079544 A1* | 4/2008 | Kodialam et al. .................. | 340/10.2 |

FOREIGN PATENT DOCUMENTS

| | | | |
|---|---|---|---|
| KR | 2005096189 | * | 10/2005 |
| KR | 10-2006-0007135 A | | 1/2006 |
| KR | 10-0567963 B1 | | 3/2006 |

OTHER PUBLICATIONS

Su-Ryun Lee, et al.; "An Enhanced Dynamic Framed Slotted ALOHA Algorithm for RFID Tag Identification"; IEEE Computer Society; 2005.
Jihoon Myung, et al.; "*Adaptive Binary Splitting for Efficient RFID Tag Anti-Collision*"; IEEE Communications Letters; vol. 10; No. 3; Mar. 2006; pp. 144-146.
Jae-Ryong Cha, et al.; "Novel Anti-collision Algorithms for Fast Object Identification in RFID System"; IEEE Computer Society; 2005.
Roy Want; "*An Introduction to RFID Technology*"; Pervasive Computing; Jan.-Mar. 2006; pp. 25-33.
Augustus J. E. M. Janssen, et al.; "*Analysis of Contention Tree Algorithms*"; IEEE Transactions on Information Theory; vol. 46; No. 6; Sep. 2000; pp. 2163-2172.

* cited by examiner

*Primary Examiner* — Benjamin C Lee
*Assistant Examiner* — Curtis King
(74) *Attorney, Agent, or Firm* — Edwards Wildman Palmer LLP; Kongsik Kim

(57) ABSTRACT

The present application discloses a system and a method for tag estimation and anti-collision in an RFID system, which can estimate an exact number of tags within an RF area and can rapidly identify tags by using the estimated number of tags in an RFID system. The system includes an RFID reader and RFID tags. The RFID reader includes an identification means, a collision management means, a tag number estimation means, and a reader control means. The RFID tag includes a tag communication means, a message reading means, a counter management means, an information storage means, and a tag control means. The disclosed system and method can prevent occurrence of too many idle times slots in the DFSA and too many initial collisions in the binary tree scheme, and thus can identify a large number of tags at a high speed with a small number of time slots.

18 Claims, 11 Drawing Sheets

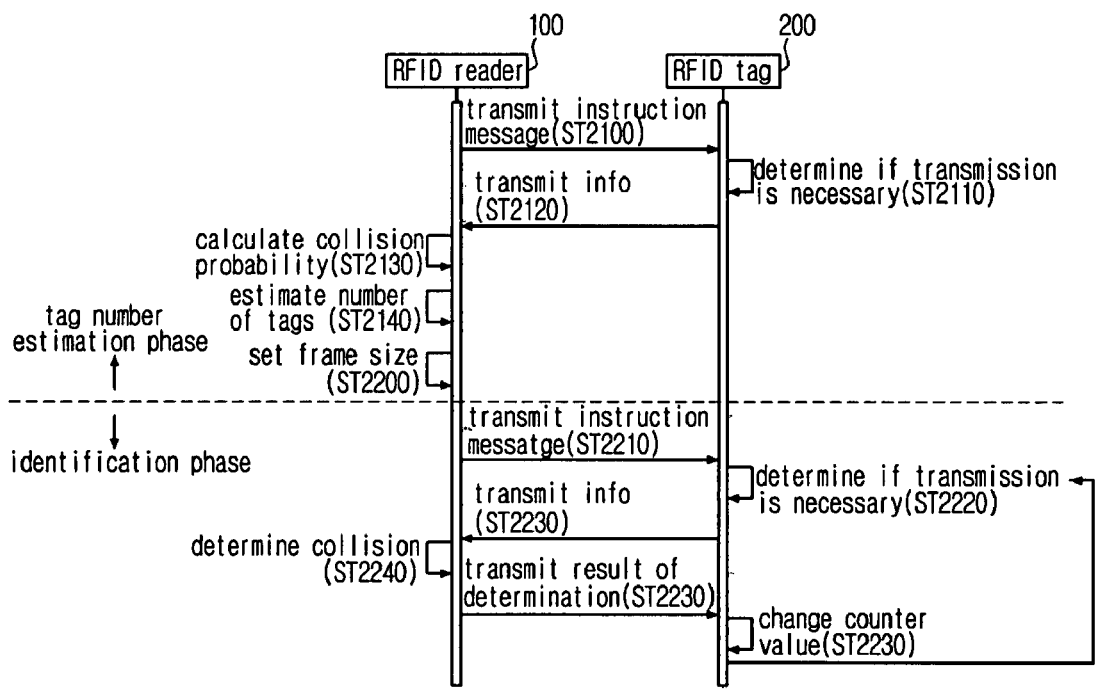

SYSTEM FOR TAG ESTIMATION AND ANTI-COLLISION AND METHOD THEREOF

CROSS-REFERENCE TO RELATED APPLICATION

The present application claims, under 35 U.S.C. §119(a), the benefit of Korean Patent Application No. 10-2006-0132162, filed Dec. 21, 2006, the entire contents of which are hereby incorporated by reference.

BACKGROUND OF THE INVENTION

1. Field of the invention

The present invention relates to a system and method for tag estimation and anti-collision of a Radio Frequency Identification (hereinafter, referred to as RFID) system, and more particularly to a system and method for tag estimation and anti-collision in an RFID system, in which an exact number of tags is estimated, information is transmitted based on a Framed-Slotted ALOHA (hereinafter, referred to as FSA) scheme by using an estimated number of tags, and the colliding tags are separated according to the binary tree scheme, thereby achieving rapid identification of the tags.

2. Background Art

As generally known in the art, an RFID system is one of the fields for automatic identification, such as bar codes and magnetic cards, and can be applied to various applied fields, such as personal identification, product identification, location tracking, and banking services. One applied field in which the RFID is most available is the logistics management in which the RFID can replace the existing bar codes.

In a case where a plurality of RFID tags exist in a radio frequency area of a reader in an RFID system, if multiple tags simultaneously transmit their identifier (ID) information to the reader at the time point when the reader wants to identify the tags, collision occurs between the transmitted ID information items, so that the reader cannot identify exact information of the tags. When such collisions increase, the reader requires more time in order to identify all of the tags. Therefore, an effective anti-collision technology is necessary in order to improve the identification speed of the RFID system.

The anti-collision technology is classified in large into an ALOHA-based scheme and a tree-based scheme. The ALOHA-based scheme mainly uses FSA and the tree-based scheme mainly uses the binary tree.

The FSA is a kind of slotted ALOHA scheme, in which time frame is divided into a predetermined number of time slots, and tags access a wireless channel by transmitting ID information based on the time slot unit. Tags generate random numbers within a predetermined frame size and access the time slot according to the order of the random numbers. If multiple tags generate the same random number, the tags access the same time slot and collide with each other. The probability of collision is determined by the number of tags and the size of the frame. Therefore, it is necessary to adjust the size of the frame according to the number of tags to be identified. An FSA having a changing frame size is called a Dynamic framed slotted ALOHA (hereinafter, referred to as DFSA).

The DFSA, an FSA changing the frame size according to situations, may use various methods for determining the frame size, which include a method of increasing the frame size when the collision probability exceeds a predetermined value while decreasing the frame size when the collision probability is below the predetermined value, and a method of estimating the number of tags by using previous frame collision and success probability, etc. and then using an optimum frame size based on the estimation. It is already known in the art that the frame size showing an optimum identification performance is equal to the number of tags.

In the conventional method of estimating the number of tags, the number of tags is calculated and estimated by using the size of a previous frame and the collision probability. The calculation of the number of tags is possible because the collision probability is a function of the frame size and the number of tags. However, when the size of the previous frame is too small in comparison with the actual number of tags, the collision probability of the tags approaches 1. Then, due to the characteristics of the exponential function, the estimation of the number of tags may be either impossible or incorrect. Therefore, the size of the initial frame is important in order to achieve estimation and identification of an exact number of tags. However, there is no reference for determination of the size of the initial frame in the initial stage, and it is thus necessary to optionally determine and use the size of the initial frame.

According to the "EPCTM radio-frequency identification protocols class-1 generation-2 UHF RFID protocol for communications at 860 MHz-960 MHz Version 1.0.9, EPCglobal, January 2005," which is a standard using the DFSA, tags generate random numbers within a predetermined range and transmit IDs according to the order of the generated random numbers, colliding tags try the transmission at a next frame, and the range of the random number is increased or decreased according to the collision probability, so as to achieve rapid identification.

According to the binary tree scheme, which is another technology for preventing tag collision, all tags transmit their ID information to a reader in the first stage of the identification process. When collision occurs, the colliding tags randomly select 0 or 1 and add the selected value to their own counters, while the tags without relation to the collision unconditionally add 1 to their own counters. Each of the counters has an initial value of 0. The counter decreases each time slot. At the moment when the counter becomes 0, a corresponding tag transmits its ID information to the reader, and the colliding tags are divided into two groups, so as to avoid the collision.

According to the "Information technology automatic identification and data capture techniques—radio frequency identification for item management air interface—part 6: parameters for air interface communications at 860-960 MHz, ISO/IEC FDIS 18000-6, November 2003," which is an RFID standard using the binary tree scheme, all tags simultaneously transmit data in the initial stage, and the tags are divided into two groups by selecting 0 or 1 when collision occurs. Then, this process is repeated until no collision occurs any more. Then, it is possible to identify all the tags.

One example of such technology for preventing tag collision is disclosed in Korean patent registration No. 0648853 (registered on Nov. 16, 2006 and entitled "Method For Preventing Tag Collision In A Radio Frequency Identification System").

The method for preventing tag collision technology disclosed in Korean patent registration No. 0648853 includes the steps: (a1) detecting the number of tags causing collision within a Radio Frequency (RF) field; (b1) generating a random number having a short bit when the number of tags is below a predetermined threshold and generating a random number having a long bit when the number of tags exceeds the predetermined threshold; (c1) each tag generating collision preventing ID information having a length of m bits (m≦12) by receiving the random number having a short bit when the random number having a short bit has been generated in step (b1) and generating collision preventing ID information having a length of n bits (12<n≦24) by receiving the random number having a long bit when the random number having a long bit has been generated in step (b1); (d1) accessing each tag and processing data. That is to say, according to the method disclosed in Korean patent registration No. 0648853, the number of tags within the RF area is detected, so that the collision is prevented by using a small random number range when the detected number is below a predetermined value while using a large random number range when the detected number exceeds the predetermined value. Further, ID information items having different lengths are generated according to the number of colliding tags, so as to achieve more rapid data processing. Therefore, the method for preventing tag collision in an RFID system disclosed in Korean patent registration No. 0648853 can sharply increase the number of tags which can be simultaneously processed within a unit time period.

Further, another example of the tag collision preventing technology is disclosed in Korean patent registration No. 0567963 (registered on Mar. 30, 2006 and entitled "Method For Identifying Tags At A High Speed By Using A Division Response Frame ALOHA Scheme In An RFID System").

The method for identifying tags at a high speed by using a division response frame ALOHA scheme in an RFID system disclosed in Korean patent registration No. 0567963 includes the steps of: (a2) estimating the number of unidentified tags ($Tag_{remain}$) from responses of RFID tags to a specific number request message of an RFID reader, and then comparing the number of unidentified tags ($Tag_{remain}$) with a predetermined number of tags ($Tag_{threshold}$); (b2) selecting RFID tags capable of responding to the RFID reader by determining the number of division groups and limiting the number of tags responding to the RFID reader when the number of unidentified tags ($Tag_{remain}$) is larger than the predetermined number of tags ($Tag_{threshold}$) (c2) estimating the number of unidentified tags ($Tag_{remain}$) by receiving responses to the specific number request message of the RFID reader from the RFID tags selected in step (b2); (d2) comparing the number of unidentified tags ($Tag_{remain}$) with a predetermined number of tags ($Tag_{threshold}$) and repeatedly performing steps (b2) and (c2) until the number of unidentified tags ($Tag_{remain}$) becomes smaller than the predetermined number of tags ($Tag_{threshold}$); (e2) when the number of unidentified tags ($Tag_{remain}$) is smaller than the predetermined number of tags ($Tag_{threshold}$), adjusting the size of the frame by determining an optimum frame size, and estimating the number of unidentified tags ($Tag_{remain}$) by receiving the number of responses of the RFID tags to the specific number request message of the RFID reader; (f2) repeatedly performing step (e2) until the number of unidentified tags ($Tag_{remain}$) becomes 0. According to the method disclosed in Korean patent registration No. 0567963, tags are divided into a predetermined number of groups and the divided groups are individually identified, when an estimated number of tags is larger than a predetermined value and a maximum frame size is predetermined in the FSA scheme. According to the estimated number of tags, the size of the frame is adjusted or the number of responding tags is limited. As a result, according to the method for identifying tags at high speed by using a division response frame ALOHA scheme in an RFID system disclosed in Korean patent registration No. 0567963, the RFID reader can identify the tags with efficiency over a predetermined value regardless of change in the number of tags.

Another example of tag collision preventing technology is disclosed in a treatise by J. Myung, W. Lee, and J. Srivastava, entitled "Adaptive Binary Splitting for Efficient RFID Tag Anti-Collision" (IEEE Comm. Letter, vol. 10 no. 3 pp. 144-146, March 2006). According to this technology, transmission is based on a binary tree scheme, but tags store the transmission order in a memory without initializing the transmission order, so that the stored transmission order can be used for the next transmission. As a result, this technology can reduce the probability of collision when the same area should be read many times.

Further, another example of tag collision preventing technology is disclosed in a treatise by J. Cha and J. Kim, entitled "Novel Anti-collision Algorithms for Fast Object Identification in RFID System" (in Proc. of Parallel and Distributed System, vol. 2, pp. 63-67, July 2005). This technology proposes a method of estimating the number of tags based on the collision probability according to the FSA scheme and presenting an optimum frame size according to the number of tags.

Moreover, another example of tag collision preventing technology is disclosed in a treatise by S. Lee, S. Joo, and C. Lee, entitled "An Enhanced Dynamic Framed Slotted ALOHA Algorithm for RFID Tag Identification" (in Proc. of MobiQuitous, pp. 166-172, July 2005). According to this technology, tags are divided into a predetermined number of groups and the divided groups are individually identified, when an estimated number of tags is larger than a maximum frame size predetermined based on the FSA scheme.

However, according to the conventional ALOHA scheme, because the initial frame size is optionally fixed, the estimated number of tags is incorrect for the optimum frame size. Even in the case of DFSA using a known optimum frame size, idle time slots are generated within many frames, thereby increasing a waste of channel time during the estimation of the number of tags.

Further, according to the conventional binary tree method, each of the collided groups is always divided into two subgroups regardless of the number of tags after all tags are transmitted. Therefore, when there are many tags, too many collisions occur in the initial tag identification stage, thereby degrading the identification time performance.

Further, Korean Patent Registration Nos. 0648853 and 0567963 fail to disclose a detailed method for detecting the number of tags.

Moreover, the method disclosed in the treatise by J. Myung, W. Lee, and J. Srivastava cannot show a good performance because the initial tag identification is achieved in completely same way as that of the binary tree method. Moreover, this method can have a good performance in the reading after the initial stage only when there are a similar number of tags within the area.

In addition, the method disclosed in the treatise by J. Cha and J. Kim is relatively exact when the collision probability is low. However, as the collision probability approaches 1, it is impossible to achieve exact estimation. That is to say, for the first frame, it is impossible to determine the frame size through estimation, and it is thus inevitable to use a fixed initial frame size. When the fixed initial frame size is much smaller than the actual number of tags, the collision probability approaches 1 and it is thus impossible to estimate the exact number of tags.

Also, according to the method disclosed in the treatise by S. Lee, S. Joo, and C. Lee, the estimation of the number of tags becomes incorrect when the collision probability is high.

SUMMARY OF THE INVENTION

Accordingly, the present invention has been made to solve the above-mentioned problems occurring in the prior art, and an object of the present invention is to provide a system and method for tag estimation and anti-collision, in which colliding tags can clear away the collision according to a binary tree scheme.

It is another object of the present invention to provide a system and method for tag estimation and anti-collision, which can achieve rapid identification of RFID tags by preventing performance degradation by collision time slots due to the initial collision in the binary tree scheme and the idle time slots of the DFSA.

It is another object of the present invention to provide a system and method for tag estimation and anti-collision, which can remarkably reduce the initial collision by performing the transmission in a way similar to the FSA scheme in the initial stage and then separating only the colliding tags as in the binary tree scheme.

It is another object of the present invention to provide a system and method for tag estimation and anti-collision, which can achieve a good performance even in the initial stage of trying the tag identification, tries tag number estimation after reducing the number of responding tags for exact tag number estimation when the collision probability exceeds a predetermined value, and can show a higher performance than the performance by the methods disclosed in the treatises described above by removing the limit in the maximum frame size.

In order to accomplish this object, there is provided a system for preventing collision, which may occur when a Radio Frequency Identification (RFID) reader identifies an RFID tag in an RFID system including the RFID reader and the RFID tag, wherein the RFID reader includes: an identification means for transmitting an instruction message to the RFID tag and receiving information from the RFID tag; a collision management means for recognizing collision between the RFID tags and calculating a collision probability; a tag number estimation means for estimating the number of tags by using the collision probability; and a reader control means for generating the instruction message, setting a size of a frame to be used in identification of the RFID tag based on the estimated number of tags, and controlling identification of the RFID tag, wherein the RFID reader performs a tag number estimation phase and an identification phase in order to identify the RFID tag, identifies the RFID tag according to Framed-Slotted ALOHA (FSA) scheme by using the estimated number of tags, and identifies colliding tags according to a binary tree scheme.

The RFID tag may include: a tag communication means for receiving an instruction message from the RFID reader and transmitting stored internal information to the RFID reader; a message reading means for reading the instruction message; a counter management means for managing a counter value used for transmission of information to the RFID reader; an information storage means for storing information; and a tag control means for controlling transmission of information based on the instruction message and the counter value.

The instruction message includes information about if the estimation phase or the identification phase is to be performed, frame size information, and bitmask information containing a setup about if it is necessary to respond to the instruction message.

The collision management means compares the calculated collision probability with a collision probability threshold, the reader control means changes the bitmask information and retransmits the changed bitmask information to the RFID tag through the identification means so that only the RFID tag reduced as much as a reduction factor can respond, when the calculated collision probability exceeds the collision probability threshold, and the collision management means repeatedly calculates the collision probability until the collision probability becomes lower than the collision probability threshold.

The number n of the RFID tags is defined by $$P_{coll} = 1 - P_{idle} - P_{succ}$$
$$= 1 - \left(1 - \frac{1}{L_c}\right)^n - n \cdot \frac{1}{L_c}\left(1 - \frac{1}{L_c}\right)^{n-1},$$

wherein $P_{coll}$ denotes a collision probability, $P_{idle}$ denotes an idle probability, $P_{succ}$ denotes a success probability, and $L_c$ denotes the frame size.

The tag number estimation means has repeatedly calculated the collision probability, the tag number estimation means estimates the number of RFID tags by multiplying the calculated number of RFID tags by a reduction factor corresponding to the number of repetition.

The counter management means generates a random number within the frame size included in the instruction message and uses the generated random number as the counter value.

The counter management means decreases the counter value by 1 when the time slot, which is a unit of the frame, is a successful slot or an idle slot, and the tag control means transmits the information to the RFID reader when the counter value becomes 0.

When the collision management means recognizes occurrence of collision, a counter management means of a colliding RFID tag selects 0 or 1 and adds the selected value to its current counter value, and a counter management means of an un-colliding RFID tag adds 1 to its current counter value.

In accordance with another aspect of the present invention, there is provided a method for preventing collision, which may occur when an RFID reader identifies an RFID tag in an RFID system including the RFID reader and the RFID tag, the method including the steps of: (1) performing a tag number estimation phase for estimating the number of RFID tags by the RFID reader and the RFID tag; and (2) performing an identification phase in order to identify the RFID tag by the RFID reader, wherein, in step (2), the RFID tag is identified according to the FSA scheme by using the number of tags estimated in the tag number estimation phase, and colliding tags are identified according to a binary tree scheme.

Step (1) includes the steps of: transmitting an instruction message within an initial frame size by using the FSA scheme from the RFID reader to the RFID tag; transmitting information stored according to the received instruction message from the RFID tag to the RFID reader; recognizing collision between the RFID tags and calculating a collision probability by the RFID reader; estimating the number of RFID tags by using the collision probability by the RFID reader; and setting the number of tags estimated in the tag number estimation phase as the size of the frame.

Step (2) includes the steps of: transmitting the instruction message to the RFID tag by the RFID reader; transmitting information stored according to the received instruction message to the RFID reader by the RFID tag; determining by the RFID reader if the RFID tag has collided; and identifying the RFID tag according to the FSA scheme or the binary tree scheme based on a result of the determination by the RFID reader.

The instruction message includes information about if the estimation phase or the identification phase is to be performed, frame size information, and bitmask information containing a setup about if it is necessary to respond to the instruction message.

The step of calculating the collision probability includes the steps of: comparing the calculated collision probability with a collision probability threshold by the RFID reader; changing the bitmask information and re-transmitting the changed bitmask information to the RFID tag through the identification means so that only the RFID tag reduced as much as a reduction factor can respond, when the calculated collision probability exceeds the collision probability threshold; and repeatedly calculating the collision probability until the collision probability becomes lower than the collision probability threshold.

In step (1), the number n of RFID tags is defined by $$P_{coll} = 1 - P_{idle} - P_{succ}$$
$$= 1 - \left(1 - \frac{1}{L_c}\right)^n - n \cdot \frac{1}{L_c}\left(1 - \frac{1}{L_c}\right)^{n-1},$$

wherein $P_{coll}$ denotes a collision probability, $P_{idle}$ denotes an idle probability, $P_{succ}$ denotes a success probability, and $L_c$ denotes the frame size.

In step (1), when the collision probability has been repeatedly calculated, the number of RFID tags is estimated by multiplying the calculated number of RFID tags by a reduction factor corresponding to the number of repetition.

Each of the steps of transmission to the RFID reader includes the steps of: receiving and reading the instruction message, determining which step to be performed from among the tag number estimation step and the identification step, and determining if it is necessary to respond, by the RFID tag; generating a random number within the frame size included in the instruction message and generating a counter value used for transmission of information by using the generated random number; decreasing the counter value by 1 by the RFID tag when the time slot, which is a unit of the frame, is a successful slot or an idle slot; determining by the RFID tag if the counter value is 0; and transmitting the information to the RFID reader when the counter value is 0.

When the collision management means recognizes occurrence of collision, the step of identifying the RFID tag in step (2) includes the steps of: selecting 0 or 1 and adding the selected value to a current counter value of a colliding RFID tag by the colliding RFID tag; adding 1 to a current counter value of an un-colliding RFID tag by the un-colliding RFID tag; and identifying the RFID tag again by the RFID reader.

The present invention provides a new method for estimating an exact number of tags within an RF area and rapidly identifying tags by using the estimated number of tags in an RFID system, which can overcome the shortcomings of the prior art.

BRIEF DESCRIPTION OF THE DRAWINGS

The above and other objects, features and advantages of the present invention will be more apparent from the following detailed description taken in conjunction with the accompanying drawings, in which:

FIG. 2 is a signal flow diagram illustrating a method for estimation of the number of RFID tags and anti-collision according to an embodiment of the present invention;

DETAILED DESCRIPTION OF THE PREFERRED EMBODIMENTS

Figure 1A:
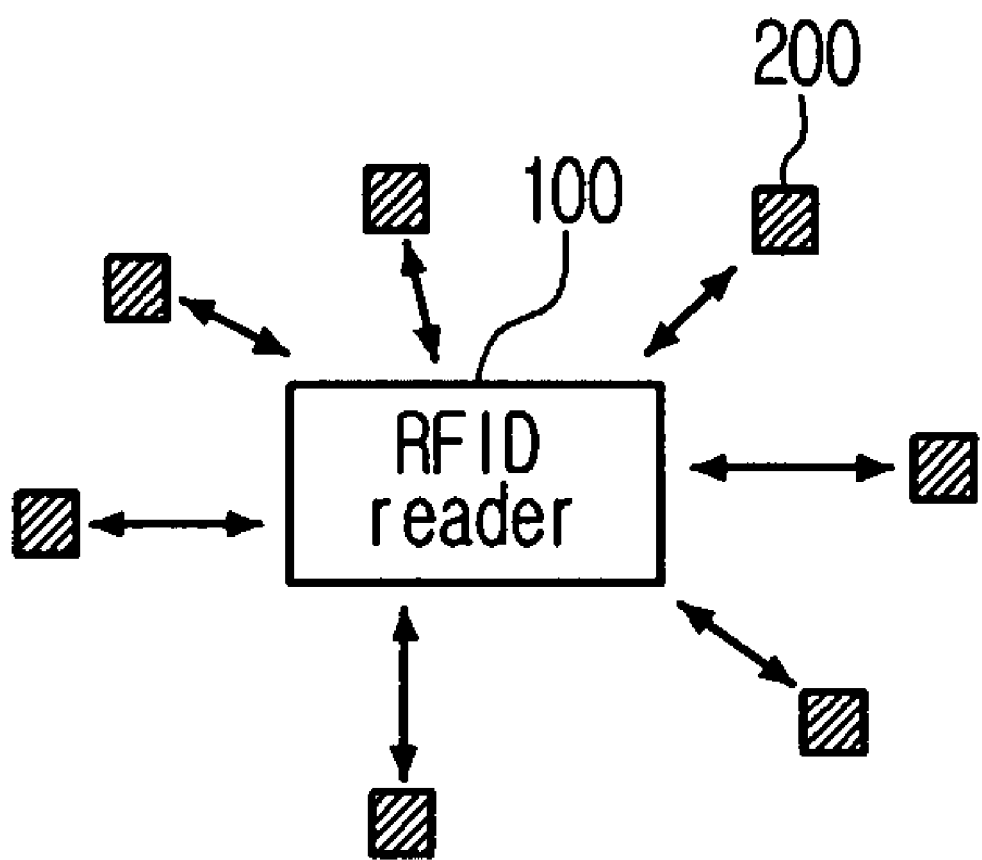
FIGS. 1a to 1c are block diagrams illustrating a system for tag estimation and anti-collision according to the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 1B:
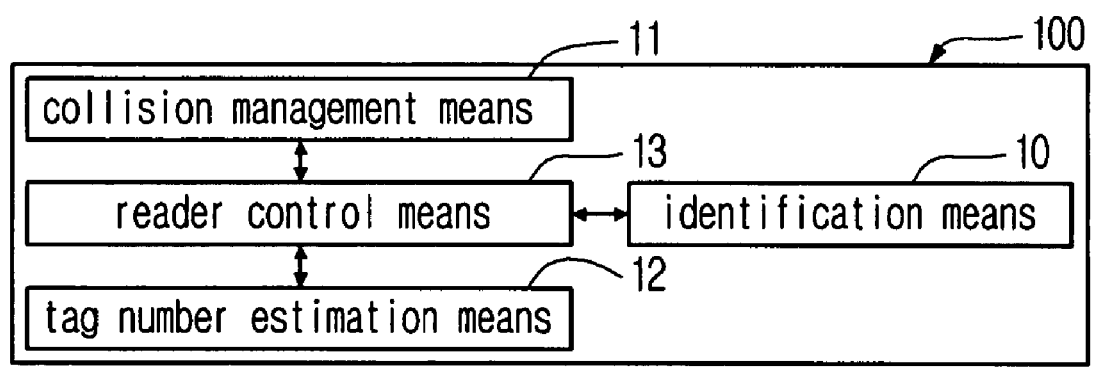
Figure 1C:
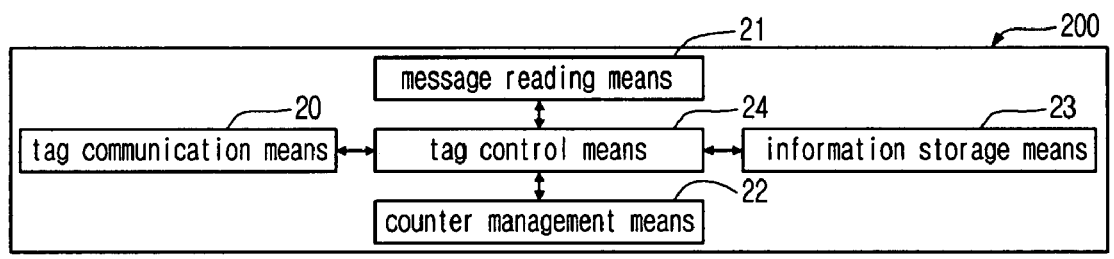

FIGS. 1a to 1c are block diagrams illustrating a system for tag estimation and anti-collision according to the present invention.

As shown in FIG. 1a, a system for tag estimation and anti-collision according to the present invention includes an RFID reader 100 and one or more RFID tags 200, which are basic elements of an RFID system. A detailed description about technology in relation to the RFID reader 100 and the RFID tag 200 is omitted here, because it is known in the art. The RFID reader 100 shown in FIG. 1a performs divided steps of estimation and identification of the number of tags, in order to identify the RFID tag 200. Then, by using the estimated number of tags, the RFID reader 100 identifies the RFID tag 200 according to the FSA scheme. When collision has occurred, the RFID reader 100 identifies the collided RFID tags according to the binary tree scheme.

Referring to FIG. 1b, the RFID reader 100 according to the present invention includes, further to the elements of a typical RFID reader, an identification means 10 for transmitting an instruction message to the RFID tag 200 and receiving information from the RFID tag 200, a collision management means 11 for recognizing collision between the RFID tags 200 and calculating a collision probability, a tag number estimation means 12 for estimating the number of tags by using the collision probability calculated by the collision management means 11, and a reader control means 13 for generating the instruction message to be transmitted to the RFID tag 200, setting the size of a frame to be used in the identification according to the estimated number of tags, controlling identification of the RFID tag 200, and generally controlling inner elements of the RFID reader 100.

Further, Referring to FIG. 1c, the RFID tag 200 according to the present invention includes, further to the elements of a typical RFID tag, a tag communication means 20 for receiving an instruction message from the RFID reader 100 and transmitting stored internal information to the RFID reader 100, a message reading means 21 for reading the received instruction message, a counter management means 22 for managing a counter value used for transmission of information to the RFID reader 100, an information storage means 23 for storing information, and a tag control means 24 for controlling transmission of information based on the instruction message and the counter value.

The instruction message transmitted to the RFID tag 200 by the RFID reader 100 includes information about if the process to be performed is a tag number estimation process or a tag number identification process, information about the size of the frame to be used in the identification process, and bitmask information containing a setup about if it is necessary to respond to the instruction message.

Hereinafter, a method for tag estimation and anti-collision according to the present invention will be described with reference to FIGS. 2 to 6.

FIG. 2 is a signal flow diagram illustrating a method for estimation of the number of RFID tags and anti-collision according to an embodiment of the present invention.

In the method for estimation of the number of RFID tags and anti-collision according to an embodiment of the present invention as shown in FIG. 2, the tag identification is performed in two phases, which include a phase of estimating the number of tags and a phase of identifying the number of tags. In the phase of estimating the number of tags, the number of tags is exactly estimated by using minimum time slots. In the phase of identifying the number of tags, the number of tags is rapidly and efficiently identified based on the estimated number of tags (frame size). Especially, in the phase of identifying the number of tags, the RFID tag 200 is identified according to the FSA scheme by using the number of tags estimated in the estimation phase, and collided RFID tags 200 are identified according to a binary tree scheme.

First, in the estimation phase, the identification means 10 of the RFID reader 100 transmits an instruction message to the tag communication means 20 of the RFID tag 200 within an initial frame size by using the FSA scheme (step ST2100). Next, the message reading means 21 of the RFID tag 200 reads the received instruction message and the tag control means 24 determines if it is necessary to transmit information (step ST2110). Then, the tag communication means 20 transmits the information stored in the information storage means 23 to the identification means 10 (step ST2120). The collision management means 11 of the RFID reader 100 identifies collision between the RFID tags 200 and calculates the collision probability (step ST2130). The tag number estimation means 12 of the RFID reader 100 estimates the number of tags based on the calculated collision probability (step ST2140). The reader control means 13 of the RFID reader 100 sets the estimated number of tags as the frame size (step ST2200).

Next, in the identification phase, the reader control means 13 of the RFID reader 100 generates an instruction message again and transmits the instruction message to the tag communication means 20 of the RFID tag 200 through the identification means 10 (step ST2210). The transmitted instruction message includes the frame size determined based on the number of tags estimated in the estimation phase. The RFID tag 200 transmits internally stored information to the identification means 10 of the RFID reader 100 according to an instruction message received as in steps ST2110 and ST2120 (step ST2230). The collision management means 11 of the RFID reader 100 determines collision of the RFID tags 200 (step ST2240), and identifies the RFID tags according to the FSA scheme or the binary tree scheme based on the result of the determination (steps ST2250 and ST2260).

The instruction message transmitted by the RFID reader 100 includes information about if the process to be performed corresponds to the estimation phase or the identification phase, frame size information, and bitmask information containing a setup about if it is necessary to respond to the instruction message. Especially, in order to enable the RFID tag 200 to discriminate between the estimation phase and the identification phase, a Flag$_{est}$ bit is added into the Query frame, which is an instruction message transmitted to the RFID tag 200. When Flag$_{est}$=1, it implies the estimation phase. In contrast, when Flag$_{est}$=0, it implies the identification phase.

In the estimation phase, the RFID tags 200 transmit their information to the RFID reader 100 within the initial frame size by using the FAS, and the RFID reader 100 measures the collision probability. The RFID reader 100 estimates the number of tags (n) by using equation (1) below based on the initial frame size ($L_c$) and the measured collision probability ($P_{coll}$).

$$P_{coll} = 1 - P_{idle} - P_{succ} \tag{1}$$
$$= 1 - \left(1 - \frac{1}{L_c}\right)^n - n \cdot \frac{1}{L_c}\left(1 - \frac{1}{L_c}\right)^{n-1}$$

In equation (1), $P_{idle}$ refers to the idle probability and $P_{succ}$ refers to the success probability.

Figure 3:
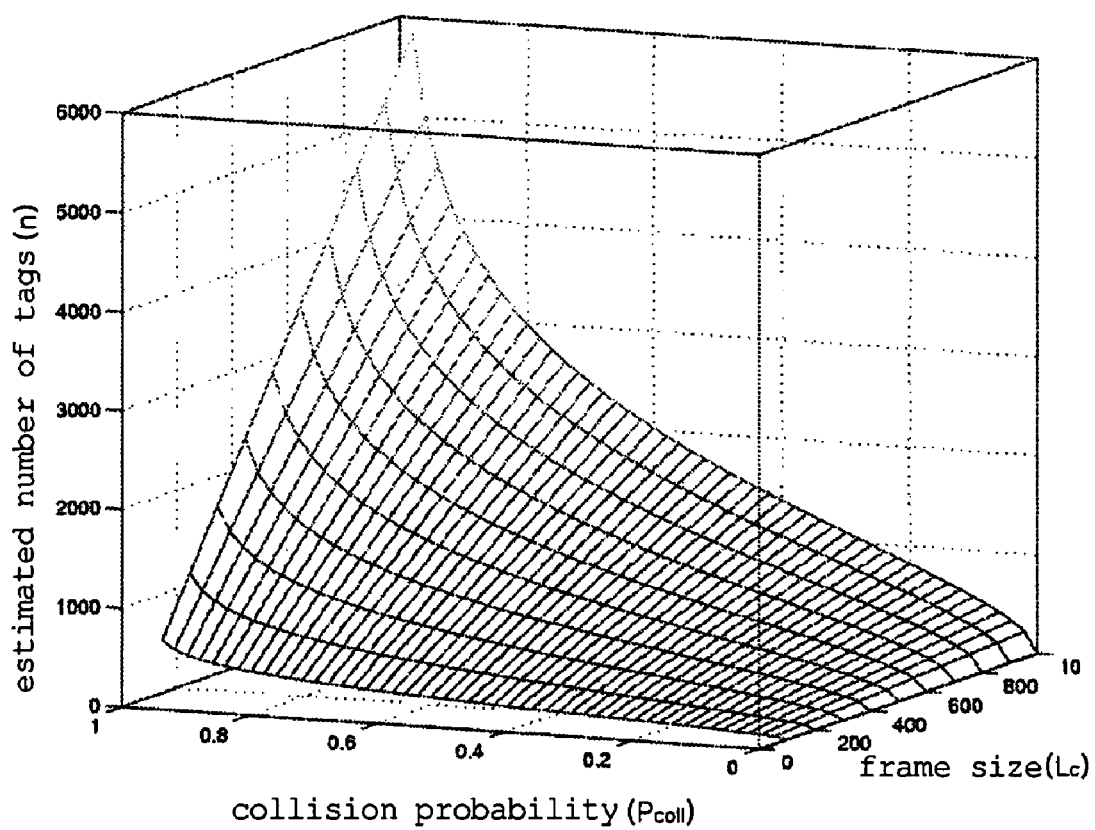
FIG. 3 is a graph illustrating a relation between the number of tags, the frame size, and the measured collision probability according to an embodiment of the present invention.

FIG. 3 is a graph illustrating a relation between the number of tags (n), the frame size ($L_c$), and the measured collision probability ($P_{coll}$) according to an embodiment of the present invention.

As noted from FIG. 3, when the collision probability is high, even a small change in the collision probability may cause abrupt change in the number of tags. Therefore, when the collision probability is high, it is highly probable that the estimation of the number of tags may be incorrect. In order to solve such a problem, the present invention uses a relatively small fixed frame size ($L_{est}$) in the estimation phase, and the collision management means 11 compares the calculated collision probability with a collision probability threshold ($P_{coll-th}$) and lowers the collision probability by reducing the number of responding tags when the calculated collision probability exceeds the collision probability threshold ($P_{coll-th}$). That is, the reader control means 13 changes the bitmask information, thereby reducing the number of responding tags, so that only the RFID tags 200 reduced as much as a reduction factor ($f_d$, $1/f_d<1$) from among all RFID tags 200 can respond. The changed bitmask information is inserted in the instruction message, which is then retransmitted to the RFID tag 200 through the identification means 10, and the collision management means 11 repeatedly performs re-calculation of the collision probability until the obtained collision probability becomes smaller than the collision probability threshold ($P_{coll-th}$). In this way, when the collision probability of the estimation phase is repeatedly calculated, the tag number estimation means 12 of the RFID reader 100 multiplies the calculated tag number by the reduction factor ($f_d$) as many times as the times of repetition in order to estimate the actual number of tags. The tag number (n) obtained in this way corresponds to a frame size (L) of the identification phase.

Hereinafter, steps ST2110, ST2120, ST2220, and ST2230, in which the RFID tag 200 receives an instruction message and transmits information to the RFID reader 100 during the estimation phase and the identification phase, will be described in detail.

First, the tag communication means 20 of the RFID tag 200 receives the instruction message, the message reading means 21 reads the received instruction message, and the tag control means 24 determines which process is to be performed and if it is necessary to respond to this message. When which process to be performed is understood and it is necessary to respond to this message, the counter management means 22 of the RFID tag 200 generates random numbers within the frame size included in the instruction message and generates a counter value used in transmission of the information. When a time slot, which is a unit of the frame, is either a successful time slot or an idle time slot, the counter management means 22 decreases the counter value 1 by 1 and determines if the counter value is 0. When the counter value becomes 0, the counter management means 22 transmits information including its own ID stored in the information storage means 23 to the RFID reader 100.

If collision occurs, the collided RFID tags 200 randomly select 0 or 1 and add the selected value to their current counter value, and the RFID tags 200 having no relation to the collision add 1 to their current counter value, thereby separating the colliding tags into two groups, and the RFID reader 100 then identifies the RFID tag 200 again.

FIGS. 4a to 5b illustrate a method for tag estimation and anti-collision according to the present invention in more detail.

Figure 4A:
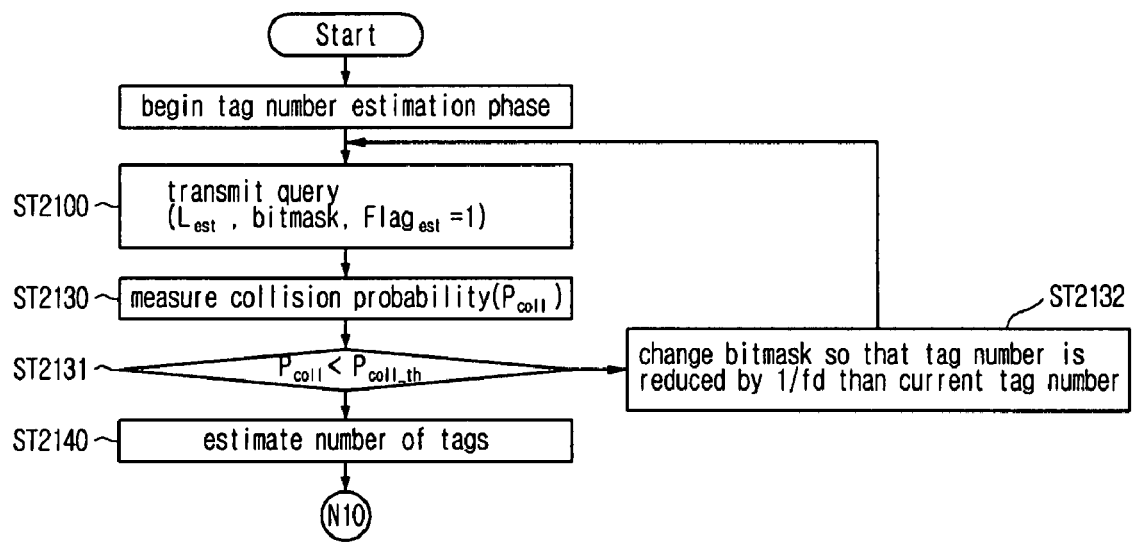
FIGS. 4a and 4b are flow diagrams illustrating an operation of an RFID reader according to an embodiment of the present invention.

FIG. 4a is a flow diagram illustrating an operation of an RFID reader according to an embodiment of the present invention.

As shown in FIG. 4a, the identification means 10 of the RFID reader 100 transmits a query, which is an instruction message, to the RFID tag 200, thereby starting the tag number estimation phase (step ST2100). The transmitted query includes small fixed frame size ($L_{est}$) information, bitmask information, and flag information representing the tag number estimation process. According to the instruction transmitted to the RFID tag 200, the RFID reader 100 receives information from the RFID tag 200, and the collision management means 11 identifies occurring collision and calculates the collision probability ($P_{coll}$) (step ST2130). The collision management means 11 compares the calculated collision probability ($P_{coll}$) with the collision probability threshold ($P_{coll-th}$), and the reader control means 13 reduces the number of responding tags by changing the bitmask information, in order to reduce the collision probability ($P_{coll}$), when the calculated collision probability ($P_{coll}$) exceeds the collision probability threshold ($P_{coll-th}$). The reader control means 13 generates the instruction message again based on the changed bitmask information, transmits the generated instruction message to the RFID tag 200, and then repeatedly performs steps ST2130 and ST2131. When the determination in step ST2131 concludes that the collision probability ($P_{coll}$) does not exceed the collision probability threshold ($P_{coll-th}$), the number of tags (n) is estimated by using equation (1) (step ST240). When step ST2132 is performed, the actual number of tags is exactly obtained based on the number of repetition as described above.

Figure 4B:
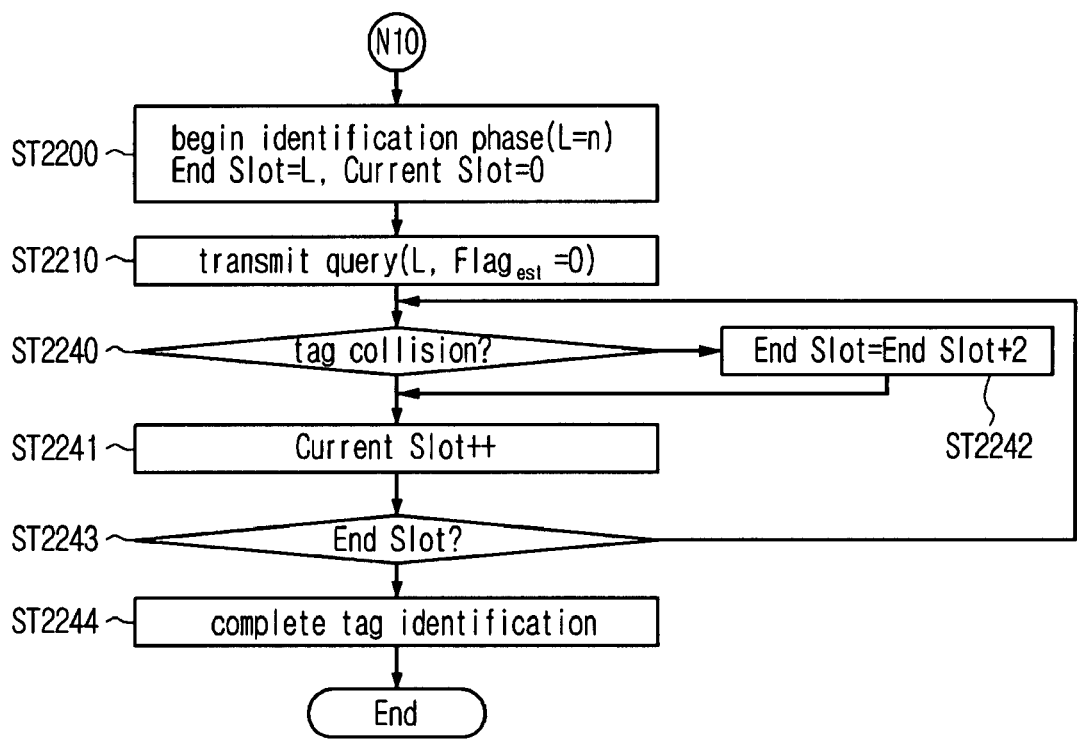

After the tag number estimation phase is performed, the next phase, that is, the identification phase is performed as shown in FIG. 4b.

Referring to FIG. 4b, the reader control means 13 sets the estimated number of tags as the frame size (step ST2200). Therefore, the frame size (L) in the initial setting that starts the identification phase is set as n, the last slot (End Slot) of the frame is set as L equal to the frame size, and the current slot is set to have a value of 0. The reader control means 13 transmits an instruction message including such information to the RFID tag 200 through the identification means 10 (step ST2210). Then, $Flag_{est}$ is set to have a value of 0 that refers to the identification phase. According to the instruction transmitted to the RFID tag 200, the RFID reader 100 receives information from the RFID tags 200, and the collision management means 11 determines if collision occurs (step ST2240). When collision does not occur, the reader control means 13 increases the current slot by 1, so that the next RFID tag 200 can be identified (step ST2241). When collision occurs, the reader control means 13 increases the end slot value by 2, thereby overcoming the collision of the RFID tags 200 and enabling identification of the RFID tags 200 (step ST2242). The reader control means 13 determines if the identification has been performed up to the last slot, or the end slot (step ST2243) and terminates the tag identification when it is the end slot (step ST2244).

Figure 5A:
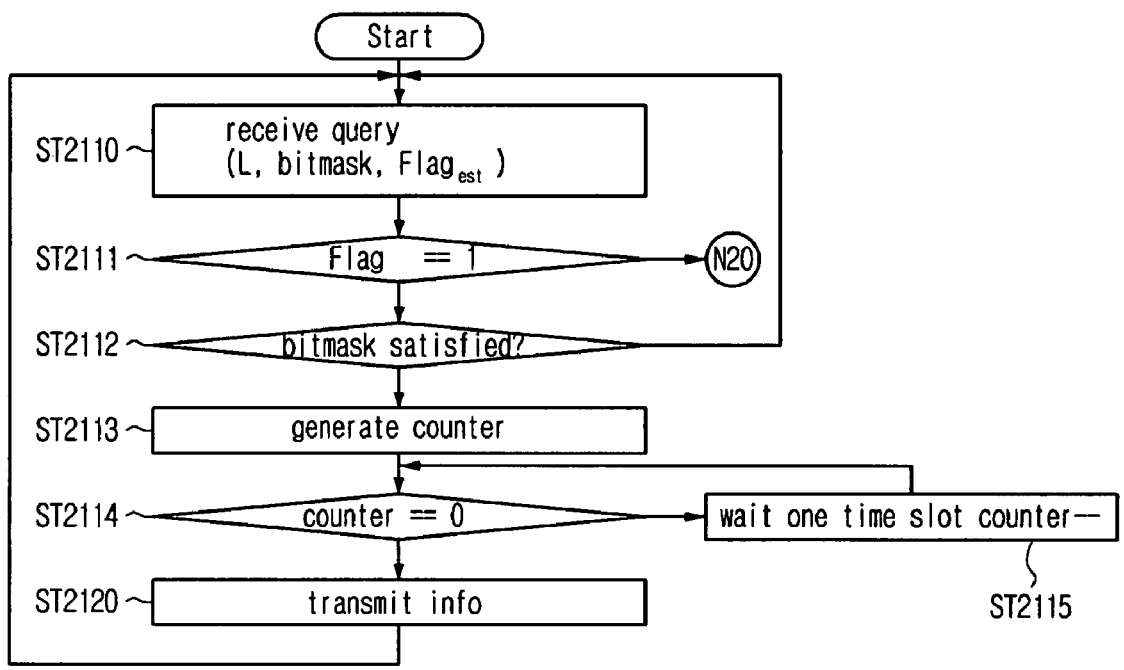
FIGS. 5a and 5b are flow diagrams illustrating an operation of an RFID tag according to an embodiment of the present invention.
Figure 5B:
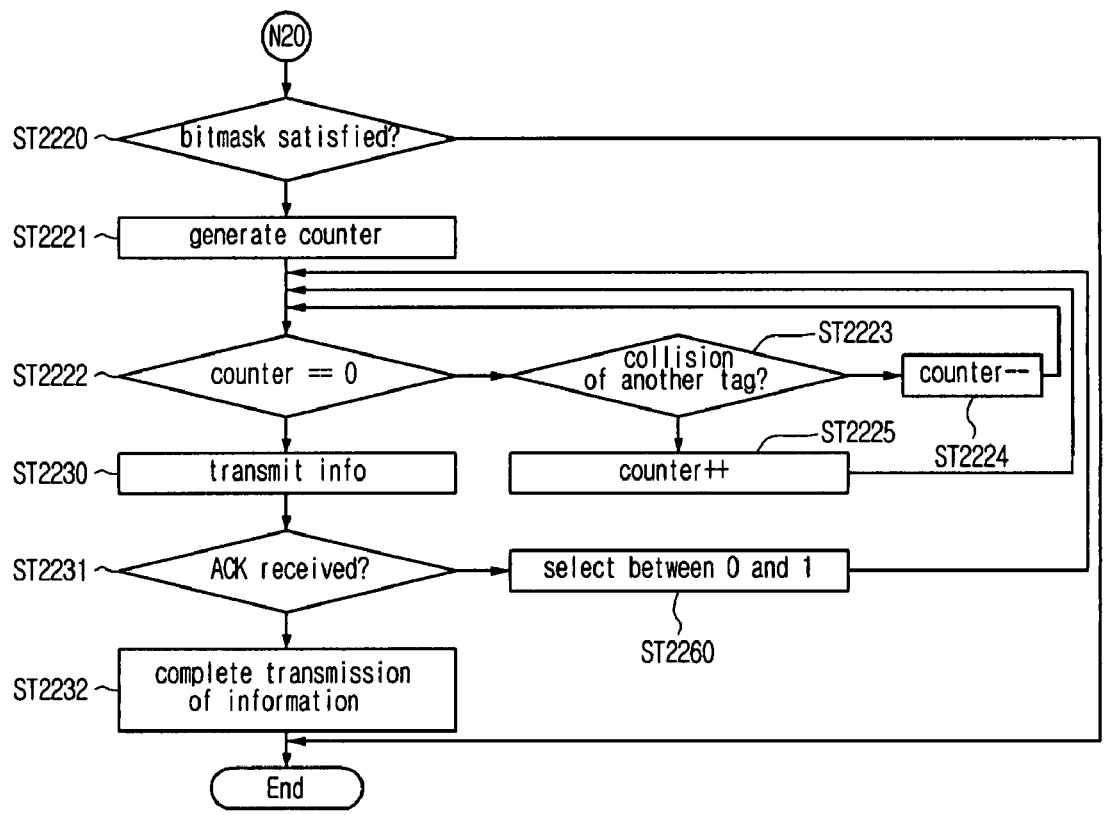

FIGS. 5a and 5b are flow diagrams illustrating an operation of an RFID tag according to an embodiment of the present invention.

As shown in FIG. 5a, first, the tag communication means 20 of the RFID tag 200 receives a query, which is an instruction message, from the RFID reader 100 (step ST2110). The received query includes frame size information, bitmask information, and flag information ($Flag_{est}$), and the message reading means 21 reads the message. When the read message corresponds to '$Flag_{est}=1$,' it implies that the current phase to be performed is a tag estimation phase (step ST2111), and that it is necessary to respond to the received instruction message when the bitmask is satisfied (step ST2112). That is, it implies that the message itself corresponds to an RFID tag to be identified by the RFID reader 100. Next, the counter management means 22 generates random numbers within the frame size included in the instruction message, thereby generating a counter value used in the transmission of information (step ST2113). When a time slot, which is a unit of the frame, is either a successful time slot or an idle time slot, the counter management means 22 decreases the counter value 1 by 1 (step ST2115) and determines if the counter value is 0 (step ST2114). When the counter value becomes 0, the counter management means 22 transmits information including its own ID stored in the information storage means 23 to the RFID reader 100 (step ST2120). Then, the RFID reader 100 calculates the collision probability ($P_{coll}$) and estimates the tag number (n), thereby setting the frame size (L).

If the determination in step ST2111 concludes that $Flag_{est}=0$, it implies that the current phase to be performed is the identification phase. Therefore, it is determined if the bitmask is satisfied (step ST2220) and the identification phase is performed. The counter management means 22 generates a random number within the frame size included in the instruction message, thereby generating a counter value used in transmitting the information (step ST2221). When a time slot, which is a unit of the frame, is either a successful time slot or an idle time slot, the counter management means 22 decreases the counter value 1 by 1 (step ST2224) and determines if the counter value is 0 (step ST2222). When the counter value becomes 0, the counter management means 22 transmits information including its own ID stored in the information storage means 23 to the RFID reader 100 (step ST2230). Then, the reader control means 13 determines if an Acknowledgement (ACK) to the transmitted information is received (step ST2231) and terminates the transmission of information when an ACK is received, which implies that collision has not occurred (step ST2232). In contrast, if an ACK is not received, which implies that the RFID tag 200 itself is a collided tag, the reader control means 13 randomly selects 0 or 1 and adds the selected value to the counter value (step ST2260). Further, when collision occurs between other tags before the counter value becomes 0 (step ST2223), the reader control means 13 adds 1 to the counter value.

Figure 6:
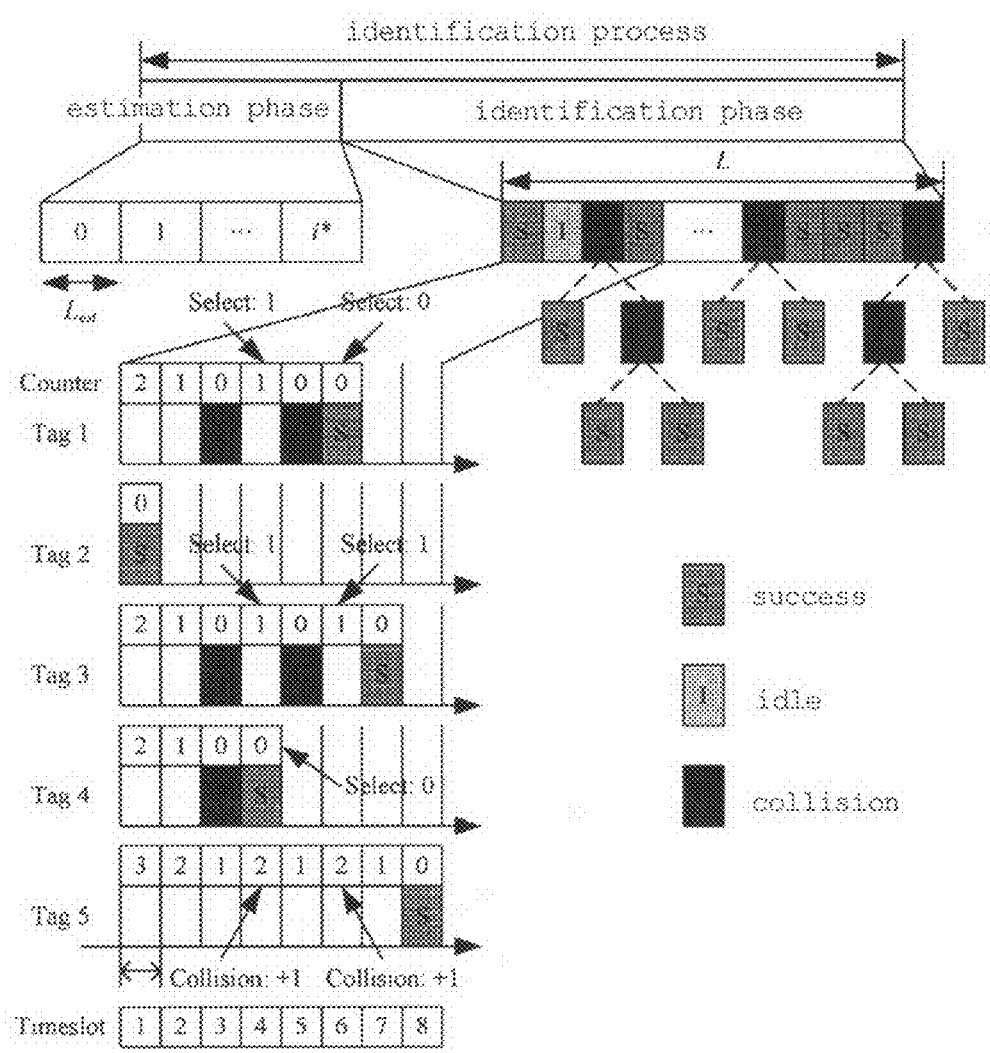
FIG. 6 illustrates a process of estimation and identification of the number of tags according to an embodiment of the present invention.

FIG. 6 illustrates a process of estimation and identification of the number of tags according to an embodiment of the present invention.

Referring to FIG. 6, collision has occurred at the third time slot between RFID tag #1 200, RFID tag #3 200, and RFID tag #4 200. Each of the colliding tags, which include RFID tag #1 200, RFID tag #3 200, and RFID tag #4 200, randomly selects 0 or 1 and adds the selected value to its own counter value. However, RFID tag #5 200, which has not participated in the collision, increases its own counter value by 1. RFID tag #4 200 selects 0 and thus makes a successful identification at the fourth time slot. RFID tag #1 200 and RFID tag #3 200 collide with each other again at the fifth time slot because they selected 1. Then, RFID tag #1 200 selects 0 and makes a success at the sixth time slot, and RFID tag #3 200 selects 1 and makes a success at the seventh time slot. After all collision is cleared away, the counter value of RFID tag #5 200 becomes 0, and RFID tag #5 200 finally transmits its ID to the RFID reader 100. Then, identification of all RFID tags 200 is finished.

According to the present invention as described above, the determination of the frame size in the process of estimation and identification of the number of tags is performed only once, differently from the DFSA. Therefore, the error in the estimation of the number of tags also occurs only once. Further, in relation to the problem that collision increases when the number of tags is estimated to be small, the present invention can reduce the loss by the frames continuing due to the collision, because the present invention clears the collision away within a corresponding frame through binary selection, instead of proceeding to the next frame when the collision occurs. Therefore, the present invention can reduce the degradation of performance although the estimation of the number of tags may be rather incorrect in comparison with the actual number of tags.

Next, comparison between the present invention and the prior art will be described hereinafter with reference to FIG. 7.

First, for performance analysis and comparison, mathematical analysis of the DFSA scheme, the binary tree scheme, and the method of the invention is presented as follows.

First, mathematical analysis of the DFSA is described below.

For analysis of the DFSA, it is assumed that the estimation of the number of tags is exact. That is, it is assumed that the number of tags to be identified is already known. Of course, it is not the actual case, so the actual performance cannot be better than the mathematically analyzed performance. The number $n_i$ of tags remaining in the $i^{th}$ frame can be obtained by equation (2) below.

$$n_i = n_{i-1} - L_{i-1} \cdot P_{succ, i-1}$$
$$= n_{i-1} - L_{i-1} \cdot n_{i-1} \cdot \frac{1}{L_{i-1}} \cdot \left(1 - \frac{1}{L_{i-1}}\right)^{n_{i-1}-1},$$
$$i \geq 1$$
(2)

In equation (2), $n_0 = L_0 = n$, and $L_i = n_i$. Under the above assumption, the size ($L_i$) of the $i^{th}$ frame is equal to the number ($n_i$) of tags of the $i^{th}$ frame. $P_{succ,i}$ refers to the success probability of the $i^{th}$ frame.

In the DFSA, a time slot necessary in order to identify all the tags can be defined by equation (3) below.

$$T_{DFSA} = \sum_{i=0}^{\infty} L_i$$
(3)

Next, mathematical analysis of the binary tree scheme is described hereinafter.

In the binary tree scheme, if the number of collision is given as $C_{BIN}(n)$ when n number of tags are identified, because a colliding tag is always divided into two groups (time slots), the number $T_{BIN}(n)$ of all time slots used in the binary tree scheme in order to identify n number of tags can be calculated by equation (4) below.

$$T_{BIN}(n) = 2C_{BIN}(n) + 1$$
(4)

Further, $p(m) = 1 - m^{-1}$ is defined as the probability that one tag would not select one time slot from among m time slots. When n number of tags do not select one time slot from among m time slots, the corresponding time slot is an idle slot. Therefore, in identifying n number of tags, the number $I(n,m)$ of idle time slots from among the m time slots is defined by equation (5) below.

$$I(n,m) = m p(m)^n$$
(5)

Further, when one time slot from among m number of time slots is selected by only one tag and is not selected by the other tags, the corresponding time slot is a successful time slot. Therefore, in identifying n number of tags, the number $S(n,m)$ of successful time slots from among the m time slots is defined by equation (6) below.

$$S(n,m) = m \cdot n p(m)^{n-1}(1 - p(m))$$
(6)

Therefore, in identifying n number of tags, the number $C(n,m)$ of collision time slots from among the m time slots is defined-by equation (7) below.

$$C(n,m) = m - I(n,m) - S(n,m)$$
(7)

If equation (7) is applied to the binary tree scheme, because each level of the tree has two time slots, the number $C_{BIN}(n,i)$ of collision time slots at the level i of the binary tree in identifying n number of tags is defined by equation (8) below.

$$C_{BIN}(n,i) = C(n, 2^i) = 2^i - I(n, 2^i) - S(n, 2^i)$$
(8)

A sum of collision slots at all levels of the binary tree scheme corresponds to the number of collision time slots occurring in the binary tree when n number of tags are identified, as defined by equation (9) below.

$$C_{BIN}(n) = \sum_{i=0}^{\infty} C_{BIN}(n, i)$$
(9)

The number of all time slots used in identifying n number of tags is defined by equation (10) below, which is derived from equation (4) and equation (9).

$$T_{BIN}(n) = 2 \sum_{i=0}^{\infty} \{2^i - I(n, 2^i) - S(n, 2^i)\} + 1$$
(10)

Hereinafter, mathematical analysis of the present invention will be described.

The method according to the present invention includes a tag number estimation phase and a tag identification phase. First, performance of the tag number estimation phase is discussed. A threshold tag number $n_{th}$ for preventing the collision probability from exceeding the collision probability threshold $P_{coll\_th}$ is defined by equation (11) below.

$$P_{coll\_th} = 1 - \left(1 - \frac{1}{L_{est}}\right)^{n_{th}} - n_{th} \cdot \frac{1}{L_{est}}\left(1 - \frac{1}{L_{est}}\right)^{n_{th}-1} \quad (11)$$

Based on equation (11), the total round number (number of repetitions) necessary in the tag number estimation phase can be defined by equation (12) below.

$$i*(n) = \underset{i \in N}{\operatorname{argmax}}\left(\left(\frac{n}{f_d^{(i-1)}} - n_{th}\right) < 0\right) \quad (12)$$

In equation (12), N denotes a set of natural numbers. Therefore, the number $T_{est}(n)$ of all time slots used in the tag number estimation phase in identifying n number of tags is defined by equation (13) below.

$$T_{est}(n) = i*(n) \cdot L_{est} \quad (13)$$

The frame size L in the identification phase is equal to the estimated number of tags.

According to the present invention, each time slot functions as a binary tree, and it is thus possible to express the total time slots used in the identification phase by an item of $T_{BIN}(k)$, wherein k denotes the number of tags selecting one time slot. Therefore, the number $T_{iden}(n)$ of all time slots used in the tag recognition phase of the present invention in identifying n number of tags is defined by equation (14) below.

$$T_{idea}(n) = \sum_{k=0}^{n}\binom{n}{k}\left(\frac{1}{L}\right)^{k}\left(1 - \frac{1}{L}\right)^{n-k} L \cdot T_{BIN}(k) \quad (14)$$

The number $T_{EB-FSA}(n)$ of time slots used in the entire tag recognition phase in identifying n number of tags is defined by equation (15) below.

$$T_{EB-FSA}(n) = T_{est}(n) + T_{iden}(n) \quad (15)$$

Figure 7:
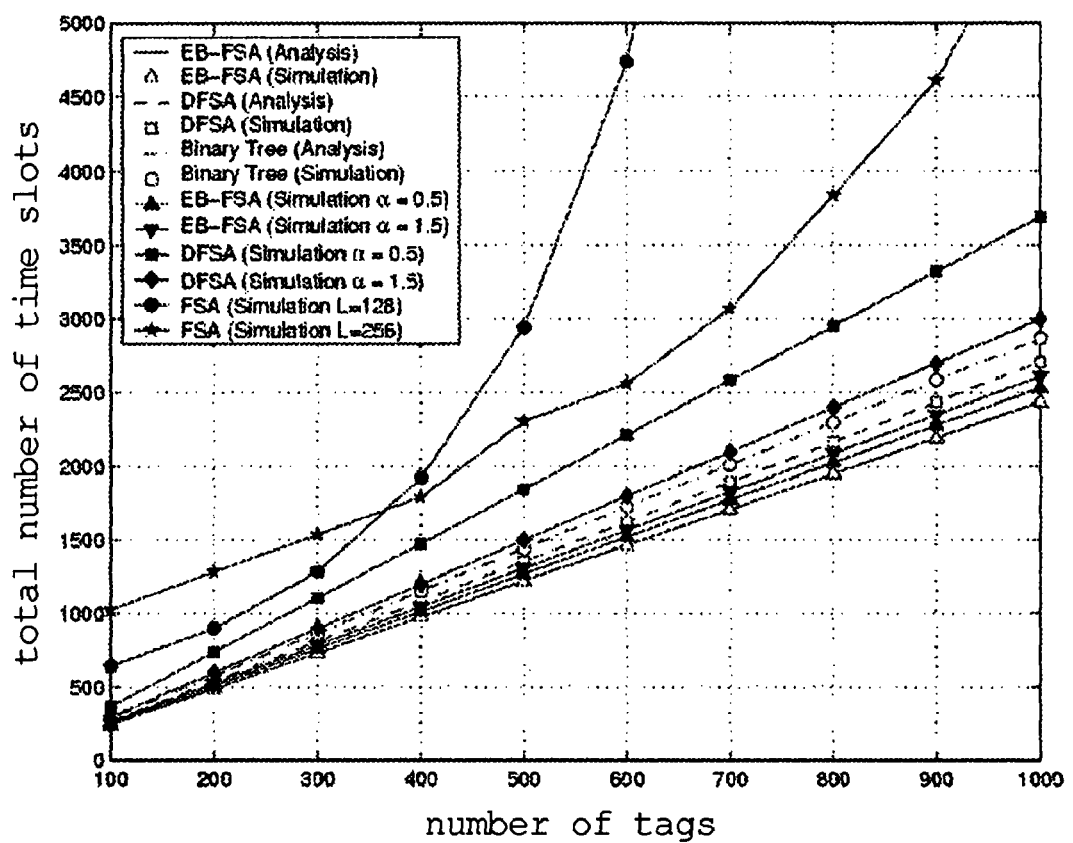
FIG. 7 is a graph illustrating comparison between the present invention and the prior art.

FIG. 7 is a graph illustrating comparison between the present invention and the prior art.

As noted from FIG. 7, tag identification simulations of the FSA, DFSA, binary tree scheme, and method of the present invention have been performed for comparison of performance.

In the FSA simulation, the frame size was fixed to 128 and 256, and a minimum frame size (0.2×n) for estimation of n number of tags by using equation (1) was used as the initial frame size of the DFSA. In the case of simulation according to the present invention, the frame size $L_{est}$ of the tag number estimation phase was set as 64, $P_{coll\_th}$ was set as 0.7, and the reduction factor $f_d$ was set as 4. In this case, the number of rounds (number of repetitions) necessary for the tag number estimation phase has a value of 3 when the number of tags is 1000. The accuracy in the tag number estimation is referred to as α.

It is noted from FIG. 7 that a result of the simulation coincides with a result of the mathematical analysis. According to the analysis, the present invention uses a least number of time slots, which is 10% and 20% smaller than the DFSA and the binary tree scheme, respectively. In the case of basic FSA, the number of used time slots rapidly increased in proportion to the increase in the number of tags. With ideal tag number estimation, the DFSA shows a better performance than the binary tree scheme. However, in the case where the estimation of the number of tags is incorrect (α=0.5: when the estimated number of tags is ½ of the actual number of tags), a rapid increase in the number of time slots necessary for the identification was observed. Therefore, it is noted that the present invention is robust against the error in the estimation of the number of tags.

The present invention can be actually applied to a logistics management system, a transport system, a distribution system, a disaster relief system, etc. in order to rapidly identify a plurality of tags, thereby improving the system performance and reducing the cost. Further, the present invention can be efficiently applied to various identification and charging systems and can replace existing systems. When the efficient RFID identification technology of the present invention is applied to a sensor network, it is possible to improve the power efficiency. Further, the present invention provides a basis on which the tag number estimation technique, which was only a theoretical approach, can be applied to an actual RFID system. Therefore, the present invention can improve the tag recognition speed and can achieve improvement in the performance of large RFID systems. Further, the present invention can be used in a place requiring a large quantity of logistics management and thus has marketability. Moreover, the present invention is superior to technology of the existing RFID development companies and is thus competent in the market of the RFID reader and tags.

As described above, in a system and method for tag estimation and anti-collision according to the present invention, the number of tags is estimated in order to determine the initial frame size by applying the binary tree scheme to only the colliding tags based on the FSA. Therefore, the method of determining the frame size according to the present invention is more accurate and effective and can efficiently clear away occurred collision.

Further, by the existing DFSA having no reference for determination of the initial frame size, it is difficult to determine the initial frame size. However, in a system and method for tag estimation and anti-collision according to the present invention, the number of tags to be identified automatically determines the number of repetitions in the estimation phase for estimation of exact tag number, and it is thus possible to optionally determine the initial frame size without any problem.

Further, a system and method for tag estimation and anti-collision according to the present invention can overcome the problems of the prior art, including occurrence of too many idle times slots in the DFSA and too many initial collisions in the binary tree scheme, and thus can identify a large number of tags at a high speed with a small number of time slots.

Moreover, a system and method for tag estimation and anti-collision according to the present invention can prevent the estimation of the number of tags from becoming more inaccurate as the collision probability of tags increases.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A system for preventing collision, which may occur when a Radio Frequency Identification (RFID) reader identifies an RFID tag in an RFID system including the RFID reader and the RFID tag, wherein the RFID reader comprises:
   an identification means for transmitting an instruction message to the RFID tag and receiving information from the RFID tag;
   a collision management means for recognizing collision between the RFID tag and additional tags and calculating a collision probability, the collision management means comparing the collision probability with a threshold, lowering the collision probability by reducing a number of tags when the collision probability exceeds the threshold, and repeatedly calculating the collision probability using the reduced number of tags after each respective lowering of the collision probability until the collision probability is smaller than the threshold;
   a tag number estimation means for estimating the number of tags by using the collision probability, the estimated number of tags being multiplied by a reduction factor after each respective lowering of the collision probability; and
   a reader control means for generating the instruction message, setting a size of a frame to be used in identification of the RFID tag based on the estimated number of tags, and controlling identification of the RFID tag,
   wherein the RFID reader performs a tag number estimation phase and an identification phase in order to identify the RFID tag, identifies the RFID tag according to Framed-Slotted ALOHA (FSA) scheme by using the estimated number of tags, and identifies colliding tags according to a binary tree scheme.

2. The system as claimed in claim 1, wherein the RFID tag comprises:
   a tag communication means for receiving an instruction message from the RFID reader and transmitting stored internal information to the RFID reader;
   a message reading means for reading the instruction message;
   a counter management means for managing a counter value used for transmission of information to the RFID reader;
   an information storage means for storing information; and
   a tag control means for controlling transmission of information based on the instruction message and the counter value.

3. The system as claimed in claim 2, wherein the instruction message includes information about if the estimation phase or the identification phase is to be performed, frame size information, and bitmask information containing a setup about if it is necessary to respond to the instruction message.

4. The system as claimed in claim 3, wherein:
   the collision management means compares the calculated collision probability with a collision probability threshold;
   the reader control means, when the calculated collision probability exceeds the collision probability threshold, changes the bitmask information and retransmits the changed bitmask information to the RFID tag through the identification means so that only the RFID tag reduced as much as the reduction factor can respond; and
   the collision management means repeatedly calculates the collision probability until the collision probability becomes lower than the collision probability threshold.

5. The system as claimed in claim 4, wherein the number n of the tags is defined by $$P_{coll} = 1 - P_{idle} - P_{succ}$$
$$= 1 - \left(1 - \frac{1}{L_c}\right)^n - n \cdot \frac{1}{L_c}\left(1 - \frac{1}{L_c}\right)^{n-1},$$

wherein $P_{coll}$ denotes a collision probability, $P_{idle}$ denotes an idle probability, $P_{succ}$ denotes a success probability, and $L_c$ denotes the frame size.

6. The system as claimed in claim 5, wherein, when the collision management means has repeatedly calculated the collision probability, the tag number estimation means estimates the number of tags by multiplying the calculated number of tags by a reduction factor corresponding to the number of repetition.

7. The system as claimed in claim 3, wherein the counter management means generates a random number within the frame size included in the instruction message and uses the generated random number as the counter value.

8. The system as claimed in claim 7, wherein:
   the counter management means decreases the counter value by 1 when the time slot, which is a unit of the frame, is a successful slot or an idle slot; and
   the tag control means transmits the information to the RFID reader when the counter value becomes 0.

9. The system as claimed in claim 8, wherein, when the collision management means recognizes occurrence of collision, a counter management means of a colliding RFID tag selects 0 or 1 and adds the selected value to its current counter value, and a counter management means of an un-colliding RFID tag adds 1 to its current counter value.

10. A method for preventing collision, which may occur when an RFID reader identifies an RFID tag in an RFID system including the RFID reader and the RFID tag, the method comprising the steps of:
    (1) performing a tag number estimation phase for estimating the number of tags by using a collision probability, the collision probability being calculated and then compared with a threshold, such that the collision probability is lowered by reducing the number of tags when the collision probability exceeds the threshold, the collision probability being repeatedly calculated using the reduced number of tags after each respective lowering of the collision probability until the collision probability is smaller than the threshold; and
    (2) performing an identification phase in order to identify the RFID tag by the RFID reader, the estimated number of tags being multiplied by a reduction factor after each respective lowering of the collision probability,
    wherein, in step (2), the RFID tag is identified according to the FSA scheme by using the number of tags estimated in the tag number estimation phase, and colliding tags are identified according to a binary tree scheme.

11. The method as claimed in claim 10, wherein step (1) comprises the steps of:
    transmitting an instruction message within an initial frame size by using the FSA scheme from the RFID reader to the RFID tag;

transmitting information stored according to the received instruction message from the RFID tag to the RFID reader;

recognizing collision between the tags and calculating a collision probability by the RFID reader;

estimating the number of tags by using the collision probability by the RFID reader; and setting the number of tags estimated in the tag number estimation phase as the size of the frame.

12. The method as claimed in claim 10, wherein step (2) comprises the steps of:

transmitting the instruction message to the RFID tag by the RFID reader;

transmitting information stored according to the received instruction message to the RFID reader by the RFID tag;

determining by the RFID reader if the RFID tag has collided; and identifying the RFID tag according to the FSA scheme or the binary tree scheme based on a result of the determination by the RFID reader.

13. The method as claimed in claim 12, wherein the instruction message includes information about if the estimation phase or the identification phase is to be performed, frame size information, and bitmask information containing a setup about if it is necessary to respond to the instruction message.

14. The method as claimed in claim 13, wherein the step of calculating the collision probability comprises the steps of:

comparing the calculated collision probability with a collision probability threshold by the RFID reader;

changing, when the calculated collision probability exceeds the collision probability threshold, the bitmask information and re-transmitting the changed bitmask information to the RFID tag through the identification means so that only the RFID tag reduced as much as the reduction factor can respond; and repeatedly calculating the collision probability until the collision probability becomes lower than the collision probability threshold.

15. The method as claimed in claim 14, wherein, in step (1), the number n of tags is defined by $$P_{coll} = 1 - P_{idle} - P_{succ}$$
$$= 1 - \left(1 - \frac{1}{L_c}\right)^n - n \cdot \frac{1}{L_c}\left(1 - \frac{1}{L_c}\right)^{n-1},$$

wherein $P_{coll}$ denotes a collision probability, $P_{idle}$ denotes an idle probability, $P_{succ}$ denotes a success probability, and $L_c$ denotes the frame size.

16. The method as claimed in claim 15, wherein, in step (1), when the collision probability has been repeatedly calculated, the number of tags is estimated by multiplying the calculated number of tags by a reduction factor corresponding to the number of repetition.

17. The method as claimed in claim 16, wherein each of the steps of transmission to the RFID reader comprises the steps of:

receiving and reading the instruction message, determining which step is to be performed from among the tag number estimation step and the identification step, and determining if it is necessary to respond, by the RFID tag;

generating a random number within the frame size included in the instruction message and generating a counter value used for transmission of information by using the generated random number;

decreasing the counter value by 1 by the RFID tag when the time slot, which is a unit of the frame, is a successful slot or an idle slot;

determining by the RFID tag if the counter value is 0; and transmitting the information to the RFID reader when the counter value is 0.

18. The method as claimed in claim 17, wherein, when the collision management means recognizes occurrence of collision, the step of identifying the RFID tag in step (2) comprises the steps of:

selecting 0 or 1 and adding the selected value to a current counter value of a colliding RFID tag by the colliding RFID tag;

adding 1 to a current counter value of an un-colliding RFID tag by the un-colliding RFID tag; and identifying the RFID tag again by the RFID reader.

* * * * *